US008006290B2

(12) United States Patent
Agrawal et al.

(10) Patent No.: US 8,006,290 B2
(45) Date of Patent: Aug. 23, 2011

(54) SYSTEM AND METHOD FOR RATIFICATION OF POLICIES

(75) Inventors: Dakshi Agrawal, Monsey, NY (US); Seraphin B. Calo, Cortlandt Manor, NY (US); James R. Giles, Evansville, IN (US); Kang-Won Lee, Nanuet, NY (US); Mukesh K. Mohania, New Delhi (IN); Dinesh Verma, Mount Kisco, NY (US); Jorge Lobo, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 11/330,932

(22) Filed: Jan. 12, 2006

(65) Prior Publication Data
US 2007/0162966 A1   Jul. 12, 2007

(51) Int. Cl.
*G06F 7/04* (2006.01)
*G06F 7/00* (2006.01)

(52) U.S. Cl. ............................. 726/6; 707/694

(58) Field of Classification Search .............. 707/200, 707/694; 709/223, 227–237; 726/1–6, 27–30
See application file for complete search history.

(56) References Cited

U.S. PATENT DOCUMENTS

| 5,889,953 A * | 3/1999 | Thebaut et al. ............... 709/221 |
| 6,327,618 B1 * | 12/2001 | Ahlstrom et al. ............. 709/223 |
| 2004/0117407 A1 * | 6/2004 | Kumar et al. ................. 707/200 |
| 2005/0246767 A1 * | 11/2005 | Fazal et al. ..................... 726/11 |

OTHER PUBLICATIONS

Agrawal, "Policy Ratification", In the Proceedings of IEEE International Workshop on Policies for Distributed System Networks (Policy 2005), Jun. 2005.

* cited by examiner

*Primary Examiner* — Michael Pyzocha
*Assistant Examiner* — Phy Anh Vu
(74) *Attorney, Agent, or Firm* — F. Chau & Associates, LLC

(57) ABSTRACT

A system and method for ratifying policies are provided. A method for ratifying a policy in a policy-based decision system comprises: determining if a new policy interacts with an existing policy in the policy-based decision system; and ratifying the new policy to exist in the policy-based decision system.

16 Claims, 7 Drawing Sheets

SYSTEM AND METHOD FOR RATIFICATION OF POLICIES

BACKGROUND OF THE INVENTION

1. Technical Field

The present invention relates to managing information technology (IT) infrastructure, and more particularly, to deploying policies in IT infrastructure.

2. Discussion of the Related Art

The prevalence of networked systems and applications in business environments has created an immense challenge for IT administrators. As networks have become ever more heterogeneous and connected to each other, scalable and distributed management of IT infrastructure has become imperative. To address this issue, policy-based management has been proposed in recent years. Instead of running customized scripts and manually configuring and auditing networked devices and applications, policy-based management allows IT administrators to specify high-level directives or policies for various management tasks such as network planning, problem detection, security and quality of service (QoS) provisions.

Policies can be specified in many different ways and multiple approaches have been suggested for different application domains. However, as the heterogeneity of devices increases and the connectivity of networks grow, policies specified in different ways using varying techniques are increasingly interacting with one another. This can often lead to undesirable effects because current policy management systems typically provide nothing more than a rudimentary syntax checking of various policies before they are deployed. Thus, policies can be written by a policy author that are irrelevant in a local environment, dominated by other policies or conflicting with already existing local policies. For example, a policy author may define a policy for Cisco switches. However, when the policy is deployed, the local domain may not have Cisco switches or the existing policies may conflict with the incoming policies for Cisco switches.

Further, even in a system employing compatible policies, a policy author may only have a partial view of the system and thus may end up writing policies that are conflicting with existing policies. For example, assume that a corporation has a policy to run a virus check on its desktop computers every week on Monday on files that have been modified in the previous week. Then assume that an employee sets a policy on their desktop such that a virus check is run on all of their files on the last business day of each month. Current policy management systems would allow this new policy to be deployed without considering its interaction with existing policies. Thus, if the last business day of the month were a Monday, two virus checks would be running concurrently, partially duplicating the work and reducing the performance of the employee's desktop.

In another example illustrating the prevalence and implications of conflicting policies, assume that a corporation has a centralized backup facility for storing files of its desktop computers. The backup policies distributed to these computers may exclude certain directories such as browser cache since their contents are typically not considered valuable. However, if an employee puts their own backup polices in place to enable backup of certain directories, they may inadvertently enable the backup of their cache files. This may happen in current policy management systems because the employee is either not aware that the corporation's backup policies exclude cache or because the employee is not aware of the location of folders containing such temporary files.

Accordingly, there is need for a technique of providing a policy author with feedback about how a new policy or policies relate to the policies existing in a managed system.

SUMMARY OF THE INVENTION

The present invention overcomes the foregoing and other problems encountered in the known teachings by providing a system and method for ratifying policies by providing local system administrators control over which policies are deployed and how conflicts are resolved in policy managed computing environments.

In one embodiment of the present invention, a method for ratifying a policy in a policy-based decision system comprises: determining if a new policy interacts with an existing policy in the policy-based decision system; and ratifying the new policy to exist in the policy-based decision system.

Determining if a new policy interacts with an existing policy comprises: determining if the new policy and the existing policy are active during the same time; determining if the new policy and the existing policy influence the same device or component of a managed system coupled to the policy-based decision system; and reviewing metapolicies associated with the new policy and the existing policy to determine if they interact with each other.

The method further comprises: determining if the new policy conflicts with the existing policy; and resolving a conflict between the new policy and the existing policy.

Determining if the new policy conflicts with the existing policy comprises: determining if a conjunction of a Boolean expression associated with the new policy and a Boolean expression associated with the existing policy can be satisfied by a set of values assigned to variables in the Boolean expressions. Determining if the new policy conflicts with the existing policy further comprises reviewing metapolicies associated with the new policy and the existing policy to determine if they are in conflict with each other.

Resolving a conflict between the new policy and the existing policy comprises: determining a priority of the new policy with respect to the existing policy; assigning a priority value to the new policy; and reassigning a priority value to the existing policy if the priority value of the new policy is higher than the priority value of the existing policy.

Resolving a conflict between the new policy and the existing policy also comprises marking the new policy inactive so that it does not conflict with the existing policy or marking the existing policy inactive so that it does not interact with the new policy.

Resolving a conflict between the new policy and the existing policy further comprises modifying the new policy or the existing policy so that they do not conflict with each other.

Resolving a conflict between the new policy and the existing policy also comprises reviewing metapolicies associated with the new policy and the existing policy to resolve a conflict therebetween.

The method further comprises: receiving the new policy; and determining if the new policy is applicable to the policy-based decision system.

In another embodiment of the present invention, a system for ratifying policies comprises: a memory device for storing a program; a processor in communication with the memory device, the processor operative with the program to: determine if a new policy interacts with an existing policy in a policy-based decision system; and ratify the new policy to exist in the policy-based decision system.

The processor is operative with the program code when determining if a new policy interacts with an existing policy to: determine if the new policy and the existing policy are active during the same time; determine if the new policy and the existing policy influence the same device or component of a managed system coupled to the policy-based decision system; and review metapolicies associated with the new policy and the existing policy to determine if they interact with each other.

The processor is further operative with the program code to: determine if the new policy conflicts with the existing policy; and resolve a conflict between the new policy and the existing policy.

The processor is further operative with the program code when determining if the new policy conflicts with the existing policy to determine if a conjunction of a Boolean expression associated with the new policy and a Boolean expression associated with the existing policy can be satisfied by a set of values assigned to variables in the Boolean expressions.

The processor is further operative with the program code when determining if the new policy conflicts with the existing policy to review metapolicies associated with the new policy and the existing policy to determine if they are in conflict with each other.

The processor is further operative with the program code when resolving a conflict between the new policy and the existing policy to: determine a priority of the new policy with respect to the existing policy; assign a priority value to the new policy; and reassign a priority value to the existing policy if the priority value of the new policy is higher than the priority value of the existing policy.

The processor is further operative with the program code when resolving a conflict between the new policy and the existing policy to mark the new policy inactive so that it does not conflict with the existing policy or mark the existing policy inactive so that it does not interact with the new policy.

The processor is further operative with the program code when resolving a conflict between the new policy and the existing policy to modify the new policy or the existing policy so that they do not conflict with each other.

The processor is further operative with the program code when resolving a conflict between the new policy and the existing policy to review metapolicies associated with the new policy and the existing policy to resolve a conflict therebetween.

The processor is further operative with the program code to: receive the new policy; and determine if the new policy is applicable to the policy-based decision system.

The processor is included in a policy-editing tool or a policy-based decision maker of the policy-based decision system.

In yet another embodiment of the present invention, a method for ratifying a new policy in a local environment comprises: determining if the new policy is relevant to the local environment; determining if the new policy interacts with an existing policy in the local environment by: determining if the new policy and the existing policy are simultaneously active; determining if the new policy and the existing policy affect the same device or component of the local environment; or determining if metapolicies associated with the new policy and the existing policy indicate interoperability; and ratifying the new policy for deployment in the local environment.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
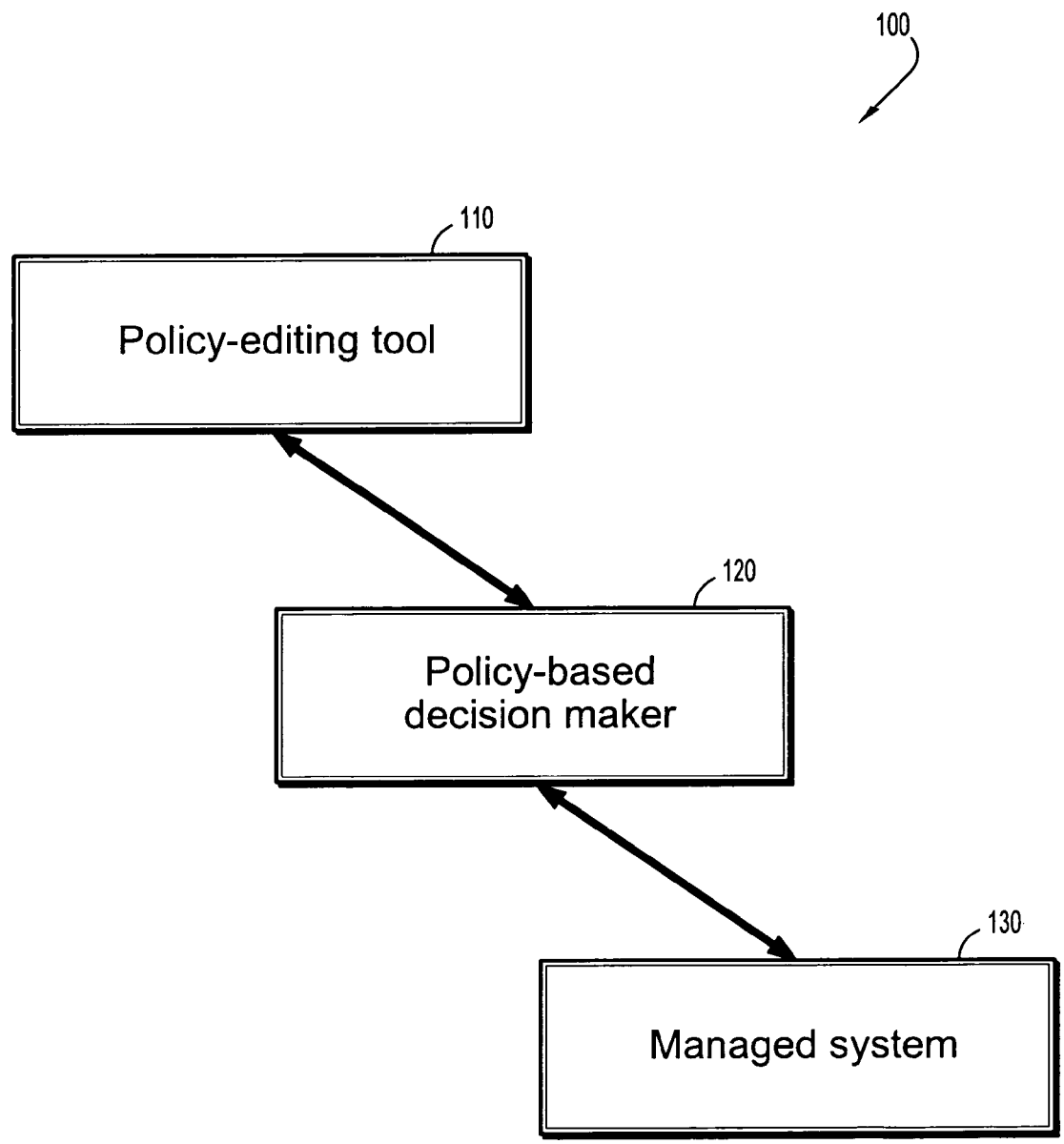
FIG. 1 is a block diagram of a conventional policy-based management system.

FIG. 1 is a block diagram of a conventional policy-based management system 100. As shown in FIG. 1, a policy-editing tool 110 and a policy-based decision maker 120 are coupled to a managed system 130. The policy-editing tool 110 and policy-based decision maker 120 are used to communicate policy rules or directives to a number of devices such as desktop computers or servers or applications such as IP telephony, real-time video teleconferencing or multimedia data streaming networked throughout the managed system 130.

In the policy-based management system 100, a system administrator typically authors or writes policies that govern the behavior of the managed system 130 using the policy-editing tool 110. These policies are then deployed in the policy-based decision maker 120 (also known as a policy decision point) which is used to provide guidance to the managed system 130. As previously discussed, newly defined policies are not ratified against policies existing in the managed system 130 except for rudimentary syntax checking.

Although not shown in FIG. 1, the policy-based decision maker 120 may be coupled to a policy-enforcement point. The policy-enforcement point is a component at a network node such as an edge router of the managed system 130 where policy rules or directives defined by the policy-editing tool 110 and policy-based decision maker 120 are enforced.

Figure 2:
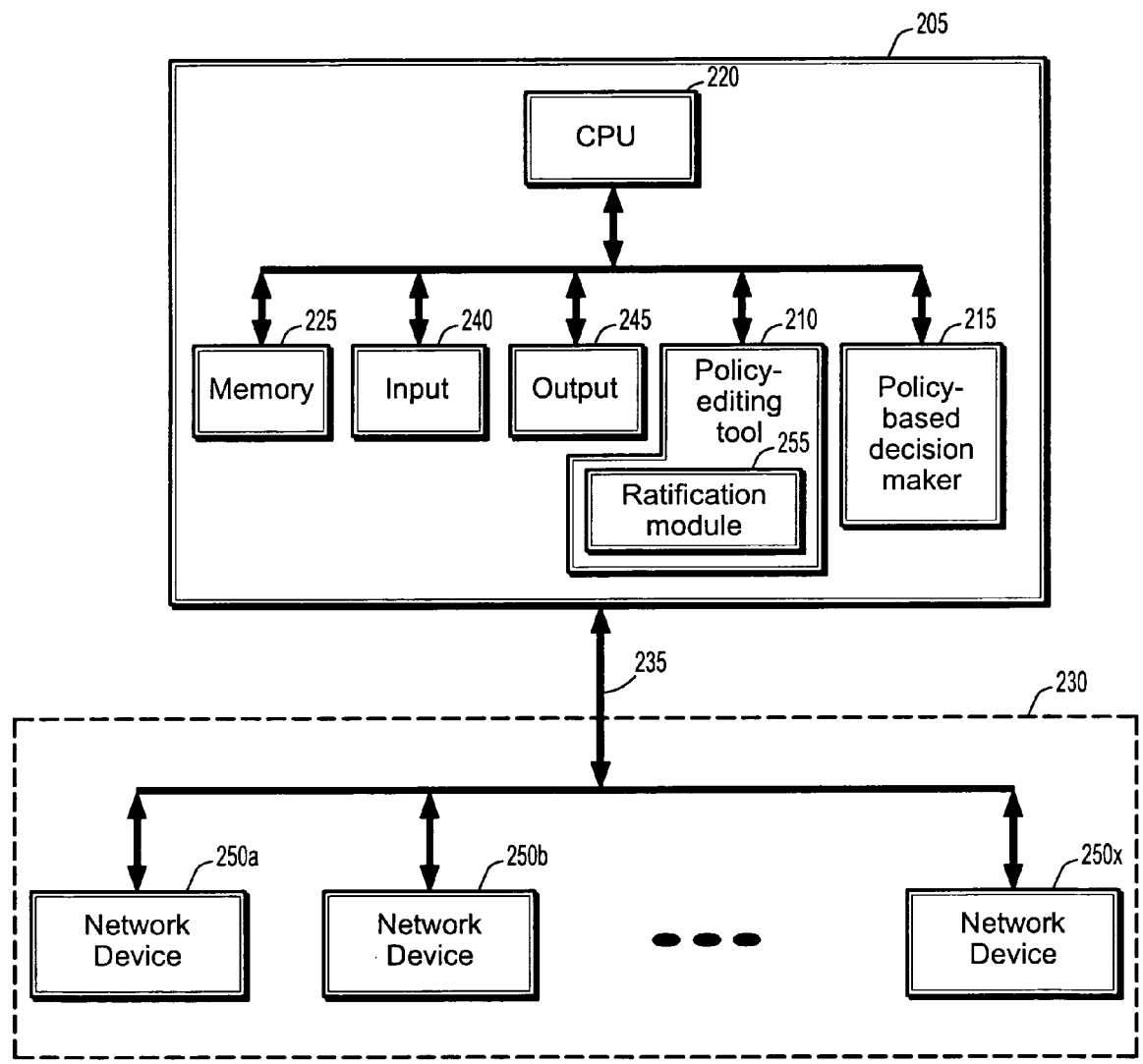
FIG. 2 is a block diagram illustrating a computer including a policy-editing tool and a policy-based decision maker according to an exemplary embodiment of the present invention.

FIG. 2 is a block diagram illustrating a computer 205 including a policy-editing tool 210 and a policy-based decision maker 215 according to an exemplary embodiment of the present invention. As shown in FIG. 2, the computer 205, which also includes a central processing unit (CPU) 220 and a memory 225, is coupled to a managed system 230 via a network-coupling device such as an Ethernet cable 235.

The memory 225 may include a random access memory (RAM) and a read only memory (ROM). The RAM functions as a data memory and stores data used during execution of a program in the CPU 220 and the ROM functions as a program memory for storing a program executed in the CPU 220. The memory 225 may also include a database, disk drive, tape drive, etc., or a combination thereof.

In addition to being coupled to the managed system 230 including a number of network devices 250a, b . . . x such as desktop computers or servers employing or facilitating applications such as IP telephony, real-time video teleconferencing or multimedia data streaming, the computer 205 may also be connected to input 240 and output 245 devices. The input device 240 may be constituted by a keyboard, mouse, etc., and the output device 245 may be constituted by a liquid crystal display (LCD), cathode ray tube (CRT) display, or printer among others.

As further shown in FIG. 2, the policy-editing tool 210 includes a ratification module 255 that includes one or more methods for ratifying new policies with existing policies in the managed system 230. This enables policies to be ratified before they are deployed in the managed system 230. Although not shown, it is to be understood that in an alternative embodiment, the policy ratification module 255 could be included in the policy-based decision maker 215 instead of the policy-editing tool 210.

Before discussing a method for ratifying policies according to the present invention, a brief description of several primitive operations and algorithms for implementing these operations follows. These operations may be performed during policy ratification according to the present invention. It is to be understood, however, that a variety of other operation types such as scope check (e.g., validating whether the scope of a policy matches that of a managed resource), version consistency check (e.g., validating if the version of incoming policies are consistent with existing policies), etc., may be performed during policy ratification.

One primitive operation for use with the present invention is referred to as dominance check. In this operation assume that a policy x is dominated by a group of policies $Y=\{y_1, \ldots, y_n\}$ ($n \geq 1$) where the addition of x does not effect the behavior of the system governed by Y. For example, a policy "password length$\geq$6" is dominated by another policy "password length$\geq$8". In another example, a policy "Joe has access to machine X from 1 P.M. to 5 P.M." is dominated by another policy "Joe has access to machine X from 8 A.M. to 7 P.M." From these examples, one can observe that determining whether a Boolean expression implies another Boolean expression is an important ratification operation. In the first example, one needs to determine that (p.length$\geq$8)$\rightarrow$(p.length$\geq$6), while in the second example, one needs to determine that (1300$\leq$t$\leq$1700)$\rightarrow$(0800$\leq$t$\leq$1900).

Another primitive operation is referred to as conflict check. In this operation assume that two policies are in conflict when they specify goals (e.g., as Boolean expressions) that cannot be satisfied simultaneously (e.g., "password length>8" and "4$\leq$password length$\leq$8"). For configuration-type policies, two policies conflict when they specify different configuration values: "disk quota=2 GB" and disk quota=1 GB". Thus, if the configuration parameters take a range of values, then conflicts among configuration policies can be defined in a similar manner as for goal policies. In an event-condition-action (ECA) model, a potential conflict among configuration-type policies may arise when the conditions of two policies can be simultaneously true. Thus, a key ratification component is to determine whether a conjunction of two Boolean expressions is satisfiable.

Yet another primitive operation is referred to as coverage check. In coverage check, a key ratification component is to determine whether a disjunction of Boolean expressions implies another Boolean expression because in many applications domains the administrator may want to know if explicit policies have been defined for a certain range of input parameters. For example, in the ECA model, the administrator may want to make sure that regardless of the values of input parameters at least one policy has a true condition.

Figure 3:
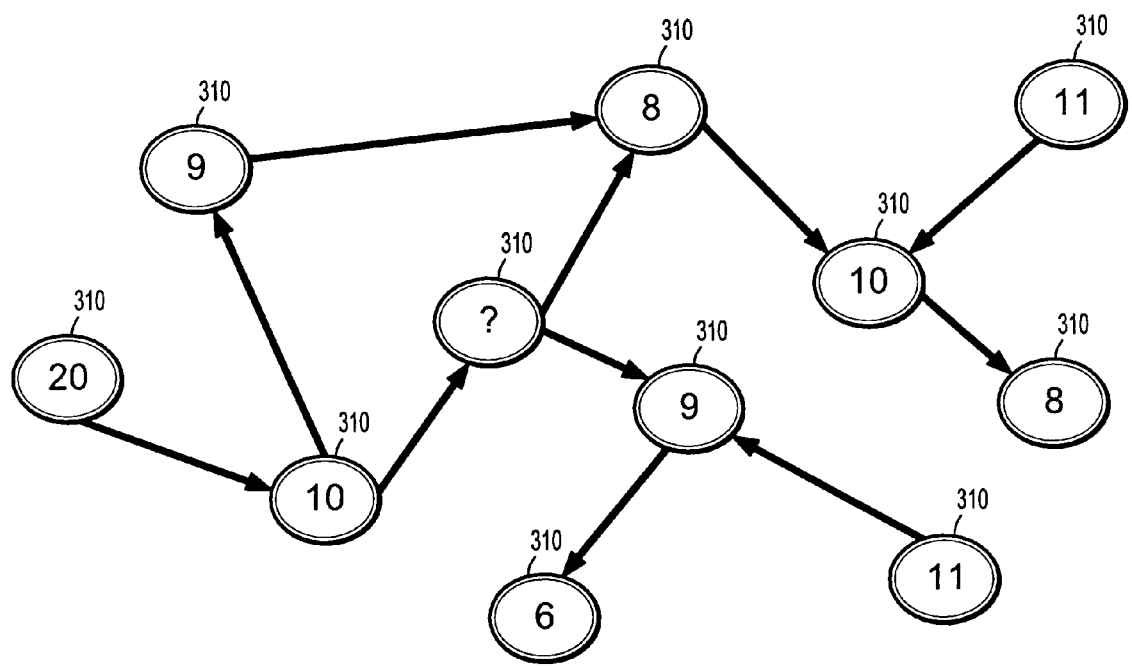
FIG. 3 is a graph illustrating a relative priority of policies.
Figure 4:
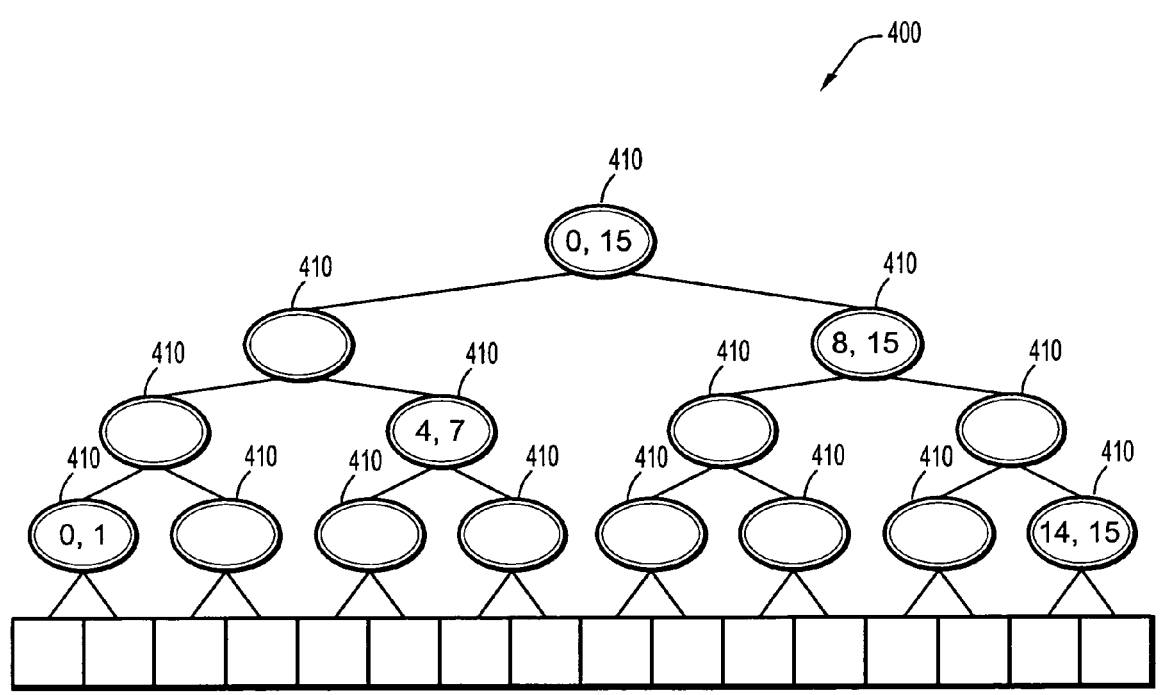
FIG. 4 is a graph illustrating a binary interval tree.

Another primitive operation is referred to as consistent priority assignment. Here, assume that most policy systems prioritize policies by assuming an integer value to each policy. Thus, when several policies apply, the one with the highest priority is executed. The manual assignment of priorities to policies can work when the number of policies is small. However, if the number of policies is large, manual priority assignment becomes infeasible. Moreover, if the assignment of priorities is not done with care, then the insertion of a new policy may require reassignment of priorities to a large number of policies. FIG. 3 illustrates one such example.

As shown in FIG. 3, each vertex 310 denotes a policy with an integer priority and each arrow connects two potentially conflicting policies with each arrow going from the policy of higher priority to the policy of lower priority. When a new policy is added (denoted by the "?" vertex), its relative priority is specified with respect to other policies in the system. In this example, the new policy cannot be assigned a priority without reassigning priorities to policies already existing in the system.

The reassignment of priorities to existing policies should be done carefully to avoid large overhead during insertions, especially if the updated policies are disseminated in a distributed system. The goal of consistent priority assignment is to take relative preferences (e.g., as shown in the priority graph of FIG. 3) specified by the policy author, including those specified during dominance and conflict checks, and to assign integer priorities to the policies so that the number of amortized reassigned priorities is minimized.

Four high-level ratification operations for a wide range of policy models have just been described. Although the details of how these high-level operations depend on the policy model and application context, the low-level operations involved are largely independent of the policy model and its application context. To minimize the amortized number of priority reassignments, algorithms for finding the satisfiability of Boolean expressions (and in some cases the set of all values for which a Boolean expression is true) and an algorithm to assign priorities to policies were determined.

It is to be understood that in determining these algorithms, policies from many different application domains such as network QoS, storage, database and identity management were examined. It was observed that the policies often involve only the subclasses of Boolean expressions for which satisfiability is tractable. As such, the approach herein is to identify categories of Booleans expressions that occur frequently in typical policies and address satisfiability for such cases. Several categories of Boolean expressions and algorithms for determining satisfiability will now be discussed.

For real valued linear constraint Boolean expressions, a modified simplex algorithm was used to find satisfiability. For one variable inequality and equality constraints, a domain elimination algorithm to find satisfiability as well as the value of variables for which the Boolean expression is true was used. For regular expression constraints, finite automata techniques to find satisfiability were used. For compound Boolean expression constraints, a solution tree algorithm was used.

In formulating the domain elimination algorithm, the conjunctive Boolean expression $\wedge_{i=1}^{n} B_i$, $B_i = x \triangleright c_i$, where $c_i$, $x \in D$ and $\triangleright \in \{=, <, \leq, >, \geq\}$ was considered. Each atomic Boolean expression $B_i$ restricts the domain of x to $D_i \subseteq D$. The algorithm works by examining Boolean expressions $\overline{B_i}$ one by one, and by computing $R_1 = \cap_{i=1}^{l} B_i$ at each step. The algorithm stops either when all inequalities and equalities have been examined or when $R_1=\phi$. If in the end, $R_n\neq\phi$, then the Boolean expression is satisfiable with $R_n$ as its solution.

The fundamental operation performed by the algorithm is the computation of $S_1\cap S_2$, where $S_1$, $S_2\subseteq D$. Efficiency is achieved by observing that there are three fundamental types of domains: totally ordered (ordered with respect to the usual<operation) continuous domains (real and calendar), totally ordered discrete domains (integer and string), and discrete unordered domains (Boolean and composite).

First, the domain elimination for an unordered domain D is considered. The input sets $S_1$, $S_2\subseteq D$ are finite and given by explicitly specifying their elements. In other words, $S_i=\{e_1^i, e_1^i, e_1^i, \ldots, e_1^i\}$ for i=1,2. Assume that the cost of deleting an element from or inserting an element in a set is negligible as compared to the cost of comparing equality between two elements. Thus, $S_1\cap S_2$ can be tested in O ($|S_1|+|S_2|$) using hashing.

For totally ordered discrete and continuous domains, sets $S_1$ and $S_2$ can be expressed in terms of expressions of the following three types: a finite discrete ordered set, an interval and a union of mutually disjoint intervals. A discrete ordered set has two extreme boundary points that are the minimum and maximum elements of the set. An interval has two boundary points: the left and right side boundary points that may or may not belong to the interval. A union of mutually disjoint l intervals and a discrete set of k elements has 2l+k boundary points. The set operations $S_1\cap S_2$ can be performed efficiently by comparing on the (extreme) boundary points of $S_1$ and $S_2$. For a general case, when $S_i$, for i=1, 2 is a union of mutually disjoint $l_i$ intervals and a discrete set with $k_i$ elements, computing $S_1\cap S_2$ can be done using a variation of the algorithm to merge two stored lists resulting in an algorithm of O ($l_1+l_2+k_1+k_2$).

The domain elimination algorithm can be implemented by using a few domain properties such as total order when the domain is continuous or discrete. Thus, the algorithm is compact, maintainable and independent of data types supported by policy language. To support additional data types, the domain properties of the new data types should be characterized. For example, to add an XML data type as a new data type, its domain D is defined as a totally ordered discrete domain and a function $x^+$ given $x\in D$ to compute is provided.

In formulating the linear inequalities algorithm, for real valued linear constraint Boolean expressions, phase 1 of a standard simplex algorithm was modified to determine if there is a non-empty feasible region that satisfies all linear constraints of atomic Boolean expressions. The linear inequalities algorithm consists of five steps.

First, normalize all linear inequalities and equalities into equations of the form $a_1X_1+a_2X_2+\ldots+a_mX_m \triangleright b$ where $\triangleright \in \{=, <, \leq, >, \geq\}$, $a_j$, $b\in R$, and the $X_j$ are variables over R. The variables are lexicographical ordered. Then, transform all equations into equalities using slack variables and limits. There are five types of equations:

$$a_1X_1+a_2X_2+\ldots+a_mX_m=b$$

$$a_1X_1+a_2X_2+\ldots+a_mX_m<b$$

$$a_1X_1+a_2X_2+\ldots+a_mX_m\leq b$$

$$a_1X_1+a_2X_2+\ldots+a_mX_m>b$$

$$a_1X_1+a_2X_2+\ldots+a_mX_m\geq b$$

Each is respectively translated into:

$$a_1X_1+a_2X_2+\ldots+a_mX_m=b$$

$$a_1X_1+a_2X_2+\ldots+a_mX_m+S=b-\epsilon$$

$$a_1X_1+a_2X_2+\ldots+a_mX_m+S=b$$

$$a_1X_1+a_2X_2+\ldots+a_mX_m-S=b+\epsilon$$

$$a_1X_1+a_2X_2+\ldots+a_mX_m-S=b$$

where S is a new slack variable, $S\geq 0$. Note that a new S is introduced for each inequality, while $\epsilon$ is an infinitesimally small positive constant which is the same for all inequalities.

Next, a matrix representation of the system is built by adding an extra column for the constant $\epsilon$. It should be understood that instead of a single column being used for the right-hand side of the equalities, the matrix representation has two columns for the right-hand side. One contains the constants b and the other contains the factor multiplying $\epsilon$ (initially 0, 1 or -1). The other columns correspond to the variables on the left-hand side.

Once the matrix representation has been built, linear transformations on the matrices with slack variables constrained as $S\geq 0$ until finding a feasible solution are performed. If a feasible solution does not exist, the spaces do not intersect. It is to be understood that when transforming the matrix to a row-reduced form and while selecting a column in a row that corresponds to a slack variable, there should not be a violation of the non-negativity of the slack variables. This is checked by comparing the sign of the factor associated with the slack variable and the sign of the result of adding the two values in columns corresponding to b and $\epsilon$. These two signs should be the same. In addition, if one of the factors is 0 the other should also be 0.

The solution tree algorithm may be used as the first step in solving satisfiability of a compound Boolean expression whose atomic formulae do not fall in the categories mentioned earlier. This algorithm is based on solving the satisfiability of such expressions by taking as an input a Boolean expression built with $\wedge$ and $\vee$ connectors and returning, one by one, each of its disjuncts on demand. In other words, it works like an iterator: the first time it is called, it returns one of the disjuncts that will be passed to the appropriate module for evaluation; next time it is called it returns a different disjunct until no more disjuncts exist. The order in which the disjuncts are returned is given by a depth-first like traversal of the tree representation of the input Boolean expression.

The solution tree algorithm uses two data structures, a stack (stack) and a solution list (list). Initially, the list is empty. The stack stores nodes from the AND-OR tree representation of the input Boolean expression with three types of nodes: AND, OR and atomic leaf nodes. AND nodes can be in two states: non-covered and covered. OR nodes can be in three states: non-covered, partially covered and covered. Given a node n and one of its ancestors a, a is a left ancestor of n if n is part of the left sub-tree of a and a right ancestor of n if n is part of the right sub-tree of a. If the root node is an AND or OR node, the node will have a pointer to the current state of the solution list. The implementation of the iterator is given by the following algorithm:

1. IF TOP(stack) = null: STOP, no more solutions.
2. IF TYPE(TOP(stack)) = atomic:
    (a) N ← POP(stack), APPEND(list,N)
    (b) P ← PARENT(N)
        i. IF ISRIGHTANCESTOR(P,N) MARK(P,covered)
        ii. IF TYPE(P) = OR ∧ISLEFTANCESTOR(P,N):
            MARK (P,partial)

-continued

```
    (c) UNTIL (P = null) ∨
         (TYPE(P) = AND ∧ISLEFTANCESTOR(P,N))
         DO P ← PARENT(P)
    (d) IF P = null: RETURN list and STOP
    (e) IF P ≠ null: MARK(P,covered)
              PUSH(P.right,stack), GOTO 1
3. IF TYPE(TOP(stack)) = AND ∧
   MARK(TOP(stack)) = noncovered:
   PUSH(TOP(stack).left,stack).
4. IF TYPE(TOP(stack)) = OR ∧
   MARK(TOP(stack)) = noncovered:
     TOP(stack).backtrackingpoint ← HEAD(list),
     PUSH(TOP(stack).left,stack).
5. IF MARK(TOP(stack)) = partial:
   MARK(TOP(stack), covered)
     HEAD(list) ← TOP(stack).backtrackingpoint,
     PUSH(TOP(stack).right,stack).
6. IF MARK(TOP(stack)) - covered: POP(stack).
7. GOTO 1.
```

The priority assignment algorithm is a modified version of an order-maintenance algorithm in a list. The basic premise of the algorithm is as follows. First, imagine a large array of size $2^n$ whose i-th cell is marked as occupied if the priority i had already been assigned to a policy. A good choice for n is the word-size of a machine. For example, a binary tree 400 of height n is logically associated with an array such that each leaf of the tree 400 corresponds to a cell 410 in the array. A group of consecutive cells can also be associated to each internal node in the tree 400.

Thus, the root of such a tree corresponds to the cells with indices in $[0, 2^n-1]$, the left child (and the right child, respectively) of the root correspond to cells with indices in $[0, 2^{n-1}-1]$ (and $[2^{n-1}, 2^n-1]$, respectively) and so forth. A density can also be associated with each internal node that equals the fraction of cells marked as occupied among the group of cells associated with the node. The goal is to keep the density of every internal node below a threshold (<1) so that there are unoccupied cells close to all locations in the array.

When a new cell is marked as occupied, it is determined whether the density of the parent node of the marked cell is above ½ when the threshold is set to be ½. If the threshold is violated, the closest ancestor of the cell is determined. The cells associated with that node are taken and the "occupied" mark is redistributed uniformly in the interval, thus reassigning priorities to some policies while keeping the relative order of the priorities of the policies the same. This ensures that the amortized number of priority reassignments is low. When the threshold is set to ½ the algorithm works as long as the number of policies in the system are less than ½ the size of the array. It should be understood that the interval associated with an i-th ancestor node of a given cell index can be determined by observing the binary representation of the index and by varying the last i bits.

The input to the algorithm may be an array of size l containing l policies ordered by their priorities plus the position i, $0 \leq i \leq l$ in the array where the new policy is to be inserted. The algorithm is now presented.

First, an empty cell is inserted in the input array's i-th position. Next, let $p_{i-1}$ and $p_{i+1}$ be the priorities of the two policies contained in the cells adjacent to the empty cell. If these priorities are not consecutive ($p_{i-1}-p_{i+1} \neq 1$), then the new policy is assigned a priority $p_i$ in the middle of $p_{i-1}$ and $p_{i+1}$ (e.g., $p_i = \lceil (p_{i-1}+p_{i+1})/2 \rceil$), and the policy is inserted in the empty cell. If $p_{i-1}$ and $p_{i+1}$ are consecutive, then the priorities for policies that are in the cells i+1, i+2, . . . , i+k are shifted by 1, where k is the smallest integer such that priorities of policies in the cells at position i+k and i+k+1 are not consecutive.

If this step cannot be performed either because of the empty cells in the position (i=1 and $p_{i-1}=2^n-1$) or because of the priorities of policies in cells at positions i+1 through l are consecutive up to $2^n-1$, then the priorities for policies that are in the cells i-1, i-2, . . . , i-k are shifted by 1, where k is the smallest integer such that priorities of policies in the cells at position i-k and i-k-1 are not consecutive. After the insertion is made, the density of the parent node of the inserted policy is checked. If it is smaller than ½, the algorithm stops. Otherwise, the first ancestor of the inserted policy with a density smaller than the threshold is found and the priority assignment is rebalanced by evenly redistributing the priorities of policies corresponding to the ancestor found in the previous step.

Figure 5:
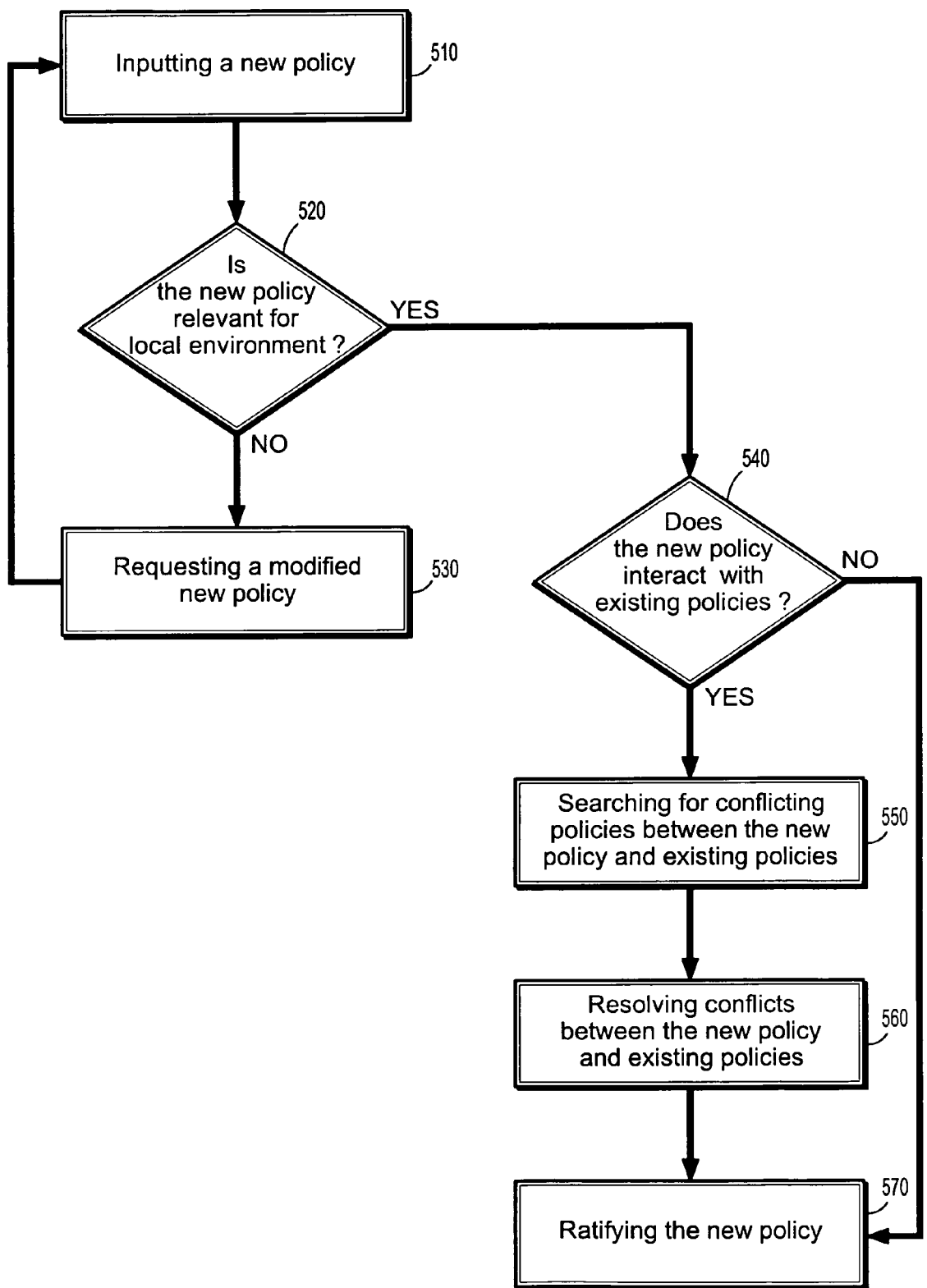
FIG. 5 is a flowchart illustrating a method for ratifying policies according to an exemplary embodiment of the present invention.

A method for ratifying policies using the above-referenced primitive operations and algorithms will now be discussed with reference to FIG. 5. As shown in FIG. 5, an administrator inputs a new policy or policies into the policy-editing tool 210 (510). The policy or policies may be, for example, a set a print policies that classify print jobs by the time of day and the number of pages with a goal of expediting the printing of small jobs during business hours. An example of the set of print policies is shown below:

PL1 If (8AM < time-of-day < 5PM) ∧(n < 10): queue = $Q_h$.
PL2 If (8AM < time-of-day < 5PM) ∧(10 < n < 30): queue = $Q_h$.
PL3 If (8AM < time-of-day < 5PM) ∧(n < 30): queue = $Q_l$.
PL4 If (4PM < time-of-day < 5PM) ∧(n < 10): queue = $Q_l$.

Because atomic Boolean expressions occurring in the conditional clauses of the policies PL1-4 are single variable linear inequality constraints, the domain elimination algorithm can be used to analyze the policies PL1-4.

Once the policies PL1-4 have been input, it is determined if they are relevant for the local environment or managed system 230 (520). In other words, it is determined if the policies PL1-4 were written for the print system employed by the local environment or if they were written for a system not employed by or incompatible with the system of the local environment. This may be done by analyzing the relevancy rules of the local environment that are already in place in the local environment. If the new policies PL1-4 satisfy all of the relevancy rules the process may proceed to step 540, if not the policies PL1-4 are sent back to the administrator for modification (530).

Figure 6:
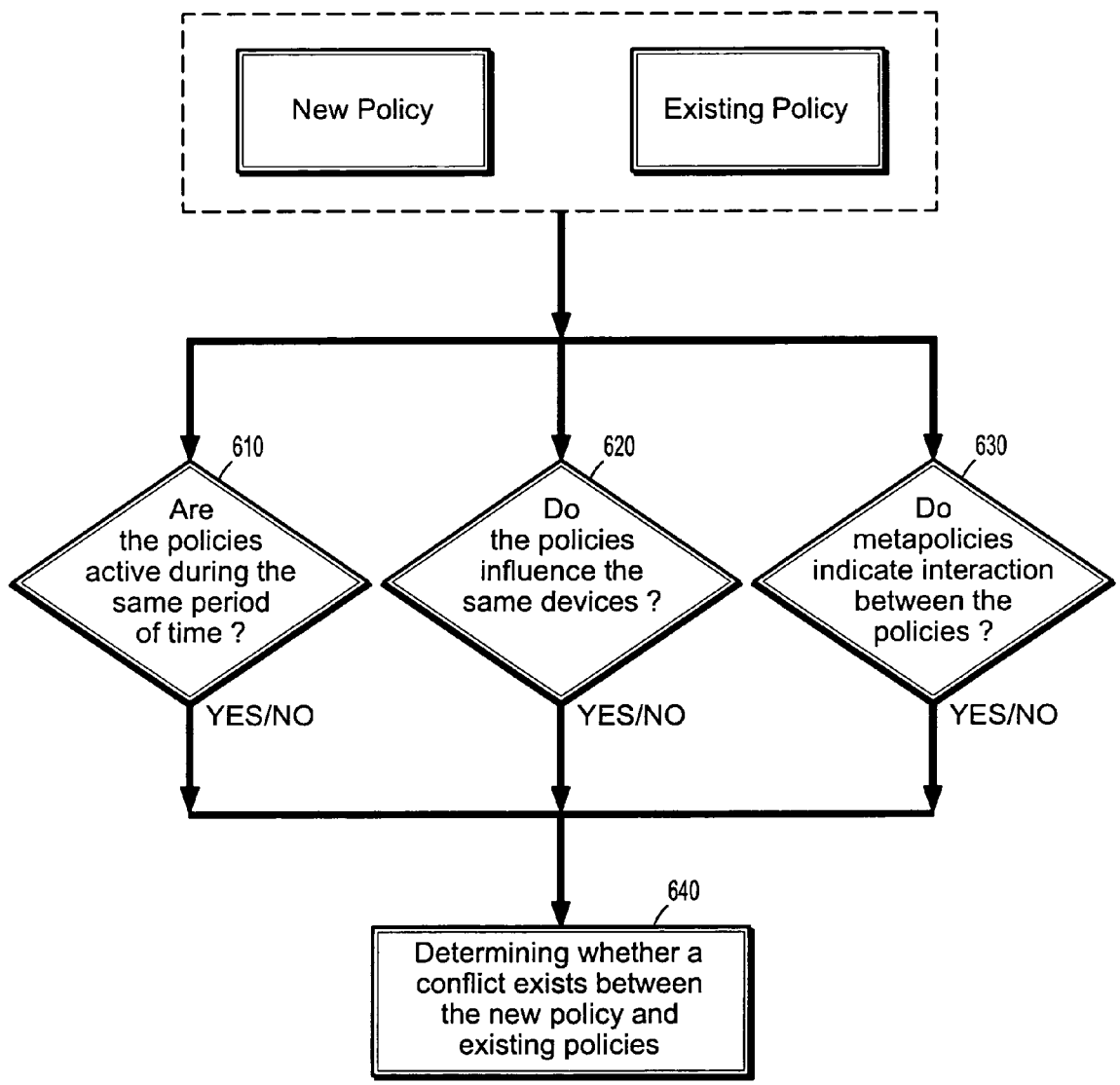
FIG. 6 is a flowchart illustrating a method for determining whether a new policy interacts with an existing policy according to an exemplary embodiment of the present invention.

If the policies PL1-4 are relevant for the local environment, it is then determined if they interact with existing policies (540). During this process, several checks may take place as shown, for example, in FIG. 6. First, it is determined if the new and existing policies are active during the same period of time (610). In other words, do they operate at the same time or during overlapping periods of time?

If the new and existing policies are active during the same time, it is determined if they influence the same devices either directly or indirectly (620). For example, two policies that govern the printer queue of a printer would directly affect the same printer. On the other hand, a policy in a logical unit number (LUN) advisor and in a storage area network (SAN) may indirectly influence the effect of a policy that performs the backup of a database server.

Subsequently, metapolicies may be evaluated to determine if the new and existing policies interact (630). For example, consider a policy of the form: if (condition) then (action). A metapolicy for determining if the new and existing policies interact may be designed to specify that: if the conjunction of conditions of the new and existing policies is satisfiable then the policies do interact and thus may be simultaneously applicable. In another embodiment, the satisfiability problem of general Boolean expressions may be divided into smaller expressions (e.g., of the same data type), and solved independently and combined to yield the solution to the original problem. For example, consider a policy of the form: (subject) (action) (target), where the subject is a user or group identity, the action is a read, write or execute and the target object is a file identifier. A metapolicy may specify that two policies of this form are simultaneously applicable when they have the same object and they have the same subject or the group subject of one policy contains the user subject of another policy.

Upon completion of steps 610-630, the results thereof are compiled and discipline specific decision logic is used to determine whether the new and existing policies interact with each other (640). If the new and existing policies do not interact with each other, they are ratified and then deployed in the local environment (570). If, however, some or all of the new and existing policies interact with each other a search is performed to determine the conflicts that exist between the new and existing policies (550).

By using the domain elimination algorithm to analyze the policies PL1-4, the conflicting policies are located as discussed above. For example, PL1 and PL4 may be detected and marked as conflicting because during the time period from 4 PM to 5 PM, if n is smaller than 10, the printer jobs are assigned to different queues. In this case, the domain elimination algorithm is used to find intersections in the time periods of PL1 and PL4. It is to be understood, however, that in general conflicts among policies can be found by determining whether a conjunction of two Boolean expressions is satisfiable. In addition, when other policy types are input by the administrator in step 510, it is to be understood that any of the algorithms described above which are compatible with the managed system 230 and its corresponding policy types may be used to perform the conflict searching operation of step 550.

Once the conflicts have been determined, they are then resolved (560). Again, since the domain elimination algorithm is used, the conflicts will also be resolved in accordance with the techniques described above with reference to the domain elimination algorithm. In addition, if another policy type is used by the managed system 230, it is to be understood that any of the algorithms described above that are compatible with the managed system 230 and its corresponding policy types may be used to perform the conflict resolving operation of step 560.

For ease of reference, however, several approaches to resolving conflicts will now be discussed. In one approach, each policy can be assigned a unique priority and when there is a conflict, the action indicated by the policy with the highest priority value can be performed. This approach however may not work as policies may be authored in multiple locations without explicit coordination or there may be no definite method of assigning priority values. In another approach, a policy can be marked inactive, or modified such that it ceases to interact with other policies.

In yet another approach, metapolicies that determine how a conflict should be resolved can be specified. For example, a metapolicy may specify that in the event of a conflict, a policy that allows a subject to read an object should prevail over a policy that allows the subject both read and write privileges.

After evaluating this metapolicy, the policy that allows both read and write privileges may be marked inactive. As a result, once the conflicts have been resolved, the new policies may then be ratified or in some cases not ratified (570).

Figure 7:
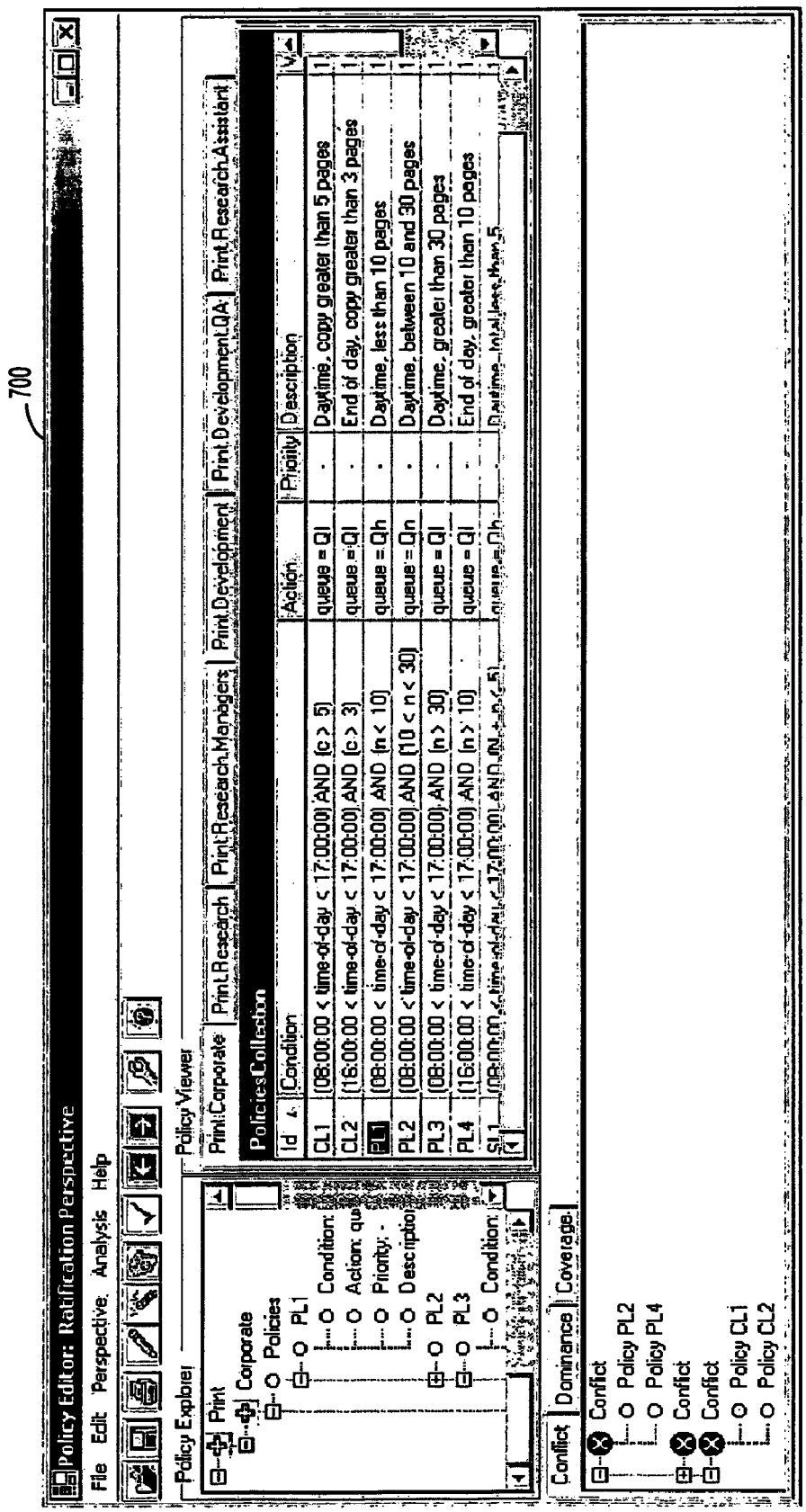
FIG. 7 is a graphical user interface illustrating print service policies for policy tools according to an exemplary embodiment of the present invention.

Once the method for ratifying is complete, the administrator may be presented with a description of the print service policies as shown, for example, by the screenshot of a graphical user interface 700 of FIG. 7. In FIG. 7, the screenshot shows from the ratification perspective where groups of policies can be viewed and analyzed for coverage, dominance and conflicts. In addition, the screenshot indicates that there are no policies for time-of-day=8 AM and 5 PM and n=30 and n=10. In this case, the administrator may want to specify non-strict inequalities for n in the policy PL2. The screenshot also indicates that the policy PL1 may be simultaneously true or conflicting with policies PL2 and PL4. In this case, the administrator may want to specify that PL1 has a higher priority than policies PL2 and PL4.

In accordance with the policy ratification techniques of an exemplary embodiment of the present invention, regardless of the policy model used in a policy system, when a new policy is written or committed in the system the system administrator will know how the new policy interacts with those already existing in the system. In addition, given a group of policies, the administrator will be able to know if it provides sufficient guidance for the system. Based on the result of the aforementioned policy ratification, administrators will be able to accept or reject new policies, assign priorities to resolve potential conflicts or mark certain policies as inactive, etc.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for ratifying a policy in a policy-based decision system, comprising:
   determining that a new policy interacts with an existing policy in the policy-based decision system;
   determining that the new policy conflicts with the existing policy by using a domain elimination algorithm;
   resolving the conflict between the new policy and the existing policy, wherein resolving the conflict between the new policy and the existing policy comprises displaying to a policy author information indicative of how to modify the new policy so that the conflict between the new policy and the existing policy can be resolved; and
   ratifying the new policy to exist in the policy-based decision system in response to the conflict between the new policy and the existing policy being resolved, determining a priority of the new policy with respect to the existing policy;
   assigning a priority value to the new policy, and
   reassigning a priority value to the existing policy if the priority value of the new policy is higher than the priority value of the existing policy
   wherein the method is performed using a microprocessor,
   wherein the domain elimination algorithm uses the following conjunctive Boolean expression $\wedge_{i=1}^{n} B_i$, $B_i = x \triangleright c_i$, where $c_i$, $x \in D$ and $\triangleright \in \{=, <, \leq, >, \geq\}$, and each atomic Boolean expression $B_i$ restricts the domain of x to $D_i \subseteq D$,
   wherein the algorithm works by examining the Boolean expressions $B_i$ one by one, and computing $R_j = \cap_{i=1}^{j} B_i$ at each step, where x is the new policy, D is a domain of existing policies, $c_i$ is a constant and $R_n$ is the solution of the algorithm indicating the result of the conflict determination.

2. The method of claim 1, wherein determining if a new policy interacts with an existing policy, comprises:
   determining if the new policy and the existing policy are active during the same time;
   determining if the new policy and the existing policy influence the same device or component of a managed system coupled to the policy-based decision system; and
   reviewing metapolicies associated with the new policy and the existing policy to determine if they interact with each other.

3. The method of claim 1, wherein determining if the new policy conflicts with the existing policy, comprises:
   reviewing metapolicies associated with the new policy and the existing policy to determine if they are in conflict with each other.

4. The method of claim 1, wherein resolving a conflict between the new policy and the existing policy, comprises:
   marking the new policy inactive so that it does not conflict with the existing policy or marking the existing policy inactive so that it does not interact with the new policy.

5. The method of claim 1, wherein resolving a conflict between the new policy and the existing policy, comprises:
   modifying the new policy or the existing policy so that they do not conflict with each other.

6. The method of claim 1, wherein resolving a conflict between the new policy and the existing policy, comprises:
   reviewing metapolicies associated with the new policy and the existing policy to resolve a conflict therebetween.

7. The method of claim 1, further comprising:
   receiving the new policy; and
   determining if the new policy is applicable to the policy-based decision system.

8. A system for ratifying policies, comprising:
   a memory device for storing a program;
   a processor in communication with the memory device, the processor operative with the program to:
   determine if a new policy interacts with an existing policy in a policy-based decision system;
   if the new policy interacts with the existing policy: determine if the new policy conflicts with the existing policy by using a domain elimination algorithm;
   if the new policy conflicts with the existing policy: resolve the conflict between the new policy and the existing policy, wherein the processor is operative with the program when resolving the conflict between the new policy and the existing policy to display to a policy author information which indicates how to modify the new policy so that the conflict between the new policy and the existing policy can be resolved; and
   ratify the new policy to exist in the policy-based decision system in response to the conflict between the new policy and the existing policy being resolved, determine a priority of the new policy with respect to the existing policy;
   assigning a priority value to the new policy; and
   reassign a priority value to the existing policy if the priority value of the new policy is higher than the priority value of the existing policy,
   wherein the domain elimination algorithm uses the following conjunctive Boolean expression $\wedge_{i=1}^{n} B_i$, $B_i = x \triangleright c_i$, where $c_i$, $x \in D$ and $\triangleright \in \{=, <, \leq, >, \geq\}$, and each atomic Boolean expression $B_i$ restricts the domain of x to $D_i \subseteq D$,
   wherein the algorithm works by examining the Boolean expressions $B_i$ one by one, and computing $R_j = \cap_{i=1}^{j} B_i$ at each step, where x is the new policy, D is a domain of existing policies, $c_i$ is a constant and $R_n$ is the solution of the algorithm indicating the result of the conflict determination.

9. The system of claim 8, wherein the processor is operative with the program when determining if a new policy interacts with an existing policy to:
   determine if the new policy and the existing policy are active during the same time;
   determine if the new policy and the existing policy influence the same device or component of a managed system coupled to the policy-based decision system; and
   review metapolicies associated with the new policy and the existing policy to determine if they interact with each other.

10. The system of claim 8, wherein the processor is operative with the program when determining if the new policy conflicts with the existing policy to:
    review metapolicies associated with the new policy and the existing policy to determine if they are in conflict with each other.

11. The system of claim 8, wherein the processor is operative with the program when resolving a conflict between the new policy and the existing policy to:
    mark the new policy inactive so that it does not conflict with the existing policy or mark the existing policy inactive so that it does not interact with the new policy.

12. The system of claim 8, wherein the processor is operative with the program when resolving a conflict between the new policy and the existing policy to:
    modify the new policy or the existing policy so that they do not conflict with each other.

13. The system of claim 8, wherein the processor is operative with the program when resolving a conflict between the new policy and the existing policy to:
 review metapolicies associated with the new policy and the existing policy to resolve a conflict therebetween.

14. The system of claim 8, wherein the processor is operative with the program to:
 receive the new policy; and
 determine if the new policy is applicable to the policy-based decision system.

15. The system of claim 8, wherein the processor is included in a policy-editing tool or a policy-based decision maker of the policy-based decision system.

16. A computer program product for ratifying a new policy in a local environment, the computer program product comprising:
 a non-transitory computer readable storage medium having computer readable program code embodied therewith, the computer readable program code comprising:
 computer readable program code configured to determine if the new policy interacts with an existing policy in the local environment;
 computer readable program code configured to determine if the new policy conflicts with the existing policy by using a domain elimination algorithm, wherein the conflict determination is made if the new policy interacts with the existing policy;
 computer readable program code configured to resolve the conflict between the new policy and the existing policy, wherein the conflict is resolved if the new policy conflicts with the existing policy, and wherein resolving the conflict between the new policy and the existing policy comprises displaying to a policy author information which indicates how to modify the new policy so that the conflict between the new policy and the existing policy can be resolved; and
 computer readable program code configured to ratify the new policy for deployment in the local environment in response to the conflict between the new policy and the existing policy being resolved, determine a priority of the new policy with respect to the existing policy;
 assign a priority value to the new policy; and
 reassign a priority value to the existing policy if the priority value of the new policy is higher than the priority value of the existing policy
 wherein the domain elimination algorithm uses the following conjunctive Boolean expression $\wedge_{i=1}^{n} B_i$, $B_i = x \triangleright c_i$, where $c_i$, $x \in D$ and $\triangleright \in \{=, <, \leq, >, \geq\}$, and each atomic Boolean expression $B_i$ restricts the domain of x to $D_i \subset D$,
 wherein the algorithm works by examining the Boolean expressions $B_i$ one by one, and computing $R_j = \cap_{i=1}^{j} B_i$ at each step, where x is the new policy, D is a domain of existing policies, $c_i$ is a constant and $R_n$ is the solution of the algorithm indicating the result of the conflict determination.

* * * * *